US006961924B2

(12) United States Patent  Bates et al.

(10) Patent No.: US 6,961,924 B2
(45) Date of Patent: Nov. 1, 2005

(54) DISPLAYING VARIABLE USAGE WHILE DEBUGGING

(75) Inventors: Cary Lee Bates, Rochester, MN (US); Steven Gene Halverson, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 10/152,466

(22) Filed: May 21, 2002

(65) Prior Publication Data

US 2003/0221185 A1    Nov. 27, 2003

(51) Int. Cl.[7] .............................................. G06F 9/44
(52) U.S. Cl. ..................... 717/125; 717/127; 714/38; 715/763
(58) Field of Search ........................ 717/124–135; 714/35, 38; 715/705, 763

(56) References Cited

U.S. PATENT DOCUMENTS

| 4,730,315 A | * | 3/1988 | Saito et al. ................ 714/38 |
| 5,432,942 A | * | 7/1995 | Trainer ...................... 717/131 |
| 5,557,730 A | * | 9/1996 | Frid-Nielsen ............... 715/839 |
| 5,752,058 A | * | 5/1998 | Van De Vanter ............ 715/531 |
| 5,752,216 A | * | 5/1998 | Carlson et al. .............. 701/120 |

OTHER PUBLICATIONS

Jones-Drndarski, Delphi 5 Debugging Techniques, Mar. 2000 (see References: Community TV: New Debugging Features in Delp 5), Total Control Information.*
U.S. Appl. No. 10/152,475, filed May 21, 2002, entitled "Descriptive Variables While Debugging".

* cited by examiner

Primary Examiner—Antony Nguyen-Ba
(74) Attorney, Agent, or Firm—Moser, Patterson & Sheridan, LLP

(57) ABSTRACT

Method, apparatus and article manufacture of debugging code. One embodiment provides a method of debugging code, comprising displaying a user interface screen of a debugging program; and in response to an event, displaying the value of the variable and a comment associated with the variable in the user interface screen in a location other than in an original location of the comment. In one embodiment, the comment associated with the variable comprises at least one of a user-drafted comment embedded in the code being debugged, an external comment retrieved from a data source external to the code being debugged, and a machine-generated comment indicative of a manner in which the variable is used. In one embodiment, the value and the comment are displayed as fly-over text.

24 Claims, 11 Drawing Sheets

300

| NAME | STUFF | ←302 |
|---|---|---|
| ID | 7253 | ←304 |
| ADDRESSING | SP + 600 | ←306 |
| TYPE | 9798 | ←308 |
| INTERNAL COMMENT | STUFF IS IMPORTANT TO OUTPUT | ←310 |
| GLOBAL ATTRIBUTE | OFF | ←312 |
| STATIC ATTRIBUTE | OFF | ←314 |
| INDEX ATTRIBUTE | OFF | ←316 |
| RETURN ATTRIBUTE | ON | ←318 |
| CALL ATTRIBUTE | ON | ←320 |
| PARAMETER ATTRIBUTE | | ←322 |
| EXTERNAL COMMENT | | ←324 |
| DECLARE LOCATION | 29 | ←326 |
| REFERENCED LOCATION | 43 | ←328 |
| UPDATED LOCATION | 44 | ←330 |

*Fig. 3*

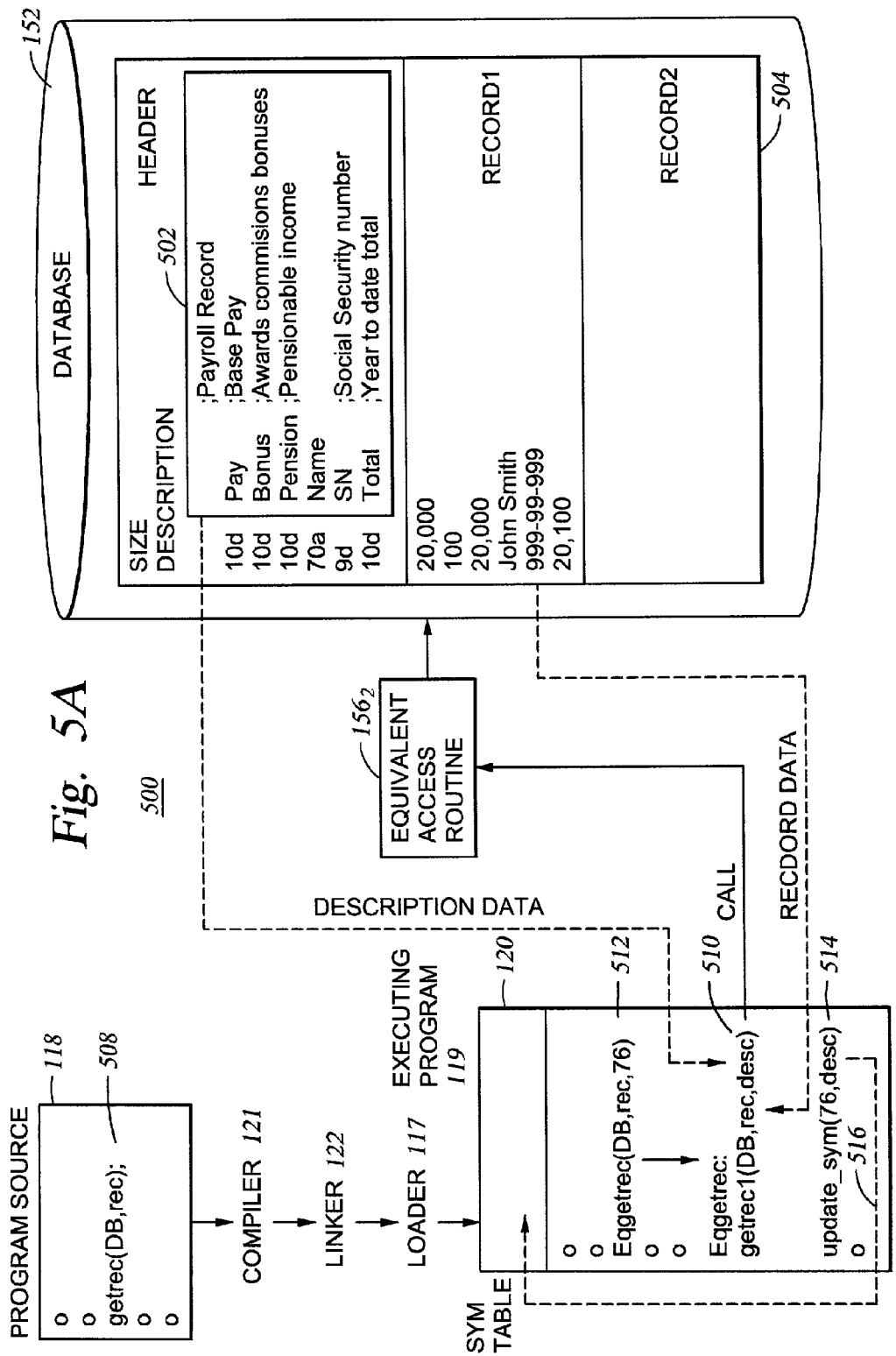

Fig. 7

BROWSER
FILE  EDIT  WINDOW  HELP

ADDRESS

```
29            STUFF stuff;    /* stuff is important to output */
30            STUFF *ptr *ptr1, *ptr2;
31     ++x;
32            strcpy (name, "shalver")
33            strcpy (test, "halverson");
34
35            memset (&stuff, 0, sizeof(stuff));
36            y = stuff.x;
37            stuff.y = 2
38            stu| Variable: stuff.y = 2 stuff is important to output; C
39            stuff.a = z;
40            stuff.str = (char *)malloc( 20 );
41            stuff.moreStuff = (MORESTUFF *)malloc( sizeof( morestuff ));
42            stuff.moreStuff -> x = 100;
43            stuffmoreStuff->y = stuff.y
44            strcpy (stuff.str, "this is a test");
```

| LOCALS | MONITOR | CONSOLE |
| NAME | VALUE | DESC |
| argv | SPP:ED7 | |
| name | SPP:ECB | |
| *name:f | "shalver" | |
| prt | SPP:*NULL | |
| prt1 | SPP:*NULL | |
| pw | SPP:D446 | |
| stuff | | |
| test | SPP:ED7F8 | Stuff is important to output; C |

700
718
729
712
714
724
716
720
722
702
118
710
704
706

DISPLAYING VARIABLE USAGE WHILE DEBUGGING

CROSS-REFERENCE TO RELATED APPLICATIONS

This application is related to U.S. Ser. No. 10/152,475, filed on May 21, 2002, by Cary Lee Bates et al., and entitled "DESCRIPTIVE VARIABLES WHILE DEBUGGING".

BACKGROUND OF THE INVENTION

1. Field of the Invention

The present invention generally relates to a debugging code and more particularly to providing descriptions for variables while debugging.

2. Description of the Related Art

A programmer develops a software program by producing and entering source code into files using a text editor program. The computer then creates an executable program by translating the source code into machine code. The machine code is the rudimentary instructions understood by a computer. Illustratively, the foregoing software development process is accomplished by running a series of programs. These programs typically include a compiler for translating the source code into machine code and a linker to link the machine code together to form a program.

When developing computer software, it is necessary to perform a function termed "debugging". Debugging involves testing and evaluating the software to find and correct any errors and improper logic operation. An effective debugger program is necessary for rapid and efficient development of software.

A conventional debugging system comprises a combination of computer hardware and debugger software that executes a user's program in a controlled manner. Debugging aids a user in identifying and correcting mistakes in an authored program by allowing the program to be executed in small segments. To this end, debugging provides functions including breakpoints, run-to-cursor, step into, step over and the like.

During debugging it is often necessary for a user to recall the purpose and content of variables. To this end, a user must first identify where a variable is defined or where the variable is first introduced. In some cases, a comment has been included with the variable in order to facilitate an understanding of the variable's use. Comments are text messages embedded in source code, typically by the programmer of the source code. The comments provide a relevant description of some construct within the source code. For example, comments are typically used in association with a variable, to describe the purpose of the variable. In this manner, the programmer or any other person viewing (e.g., for purposes of debugging the source code) the code may refer to the comments for an explanation relevant to the associated construct. However, whether or not comments are provided for a particular variable, a user is forced to manually identify the location of a variable in order to locate an associated comment.

Therefore, there is a need for making comments and/or other information associated with variables available to a user without the shortcomings of the prior art.

SUMMARY OF THE INVENTION

One embodiment provides, a method of debugging code, comprising: executing the code during a debugging session; giving control to a debugging program when a debug event occurs; displaying a user interface screen of the debugging program, wherein the user interface screen comprises a source code panel containing code; and in response to a user event, configuring the user interface screen with viewable attributes indicative of each instance of a variable in at least the code displayed in the source code panel.

Another embodiment provides a computer readable medium containing a debug program which, when executed, performs an operation comprising: while executing the code during a debugging session, taking control of the code when a debug event occurs; rendering a debugger user interface screen, wherein the user interface screen comprises a source code panel containing code; and in response to a user event, configuring the user interface screen with viewable attributes indicative of each instance of a variable in at least the code displayed in the source code panel.

Yet another embodiment provides a computer, comprising (i) a display device, (ii) a memory containing a compiler and a debug program and (iii) a processor which at least: executes the compiler to perform a compilation process. The compilation process comprises determining each instance of each variable in computer code; and updating a debug data record each instance of each variable. Further, the processor executes the debug program to perform a debugging process, comprising: in response to an event, rendering a user interface screen for display on the display device, the user interface screen comprising (i) a source code panel containing code which includes at least one instance of a variable and (ii) viewable attributes indicative of each instance of the variable in at least the code displayed in the user interface screen.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a debug data record for a variable;

FIGS. 5A–B is a diagram illustrating compilation, linking, loading and execution during which a database is accessed for external comments;

FIG. 7 is a graphical user interface screen illustrating formatting describing a selected variable.

DETAILED DESCRIPTION OF THE PREFERRED EMBODIMENTS

Figure 1:
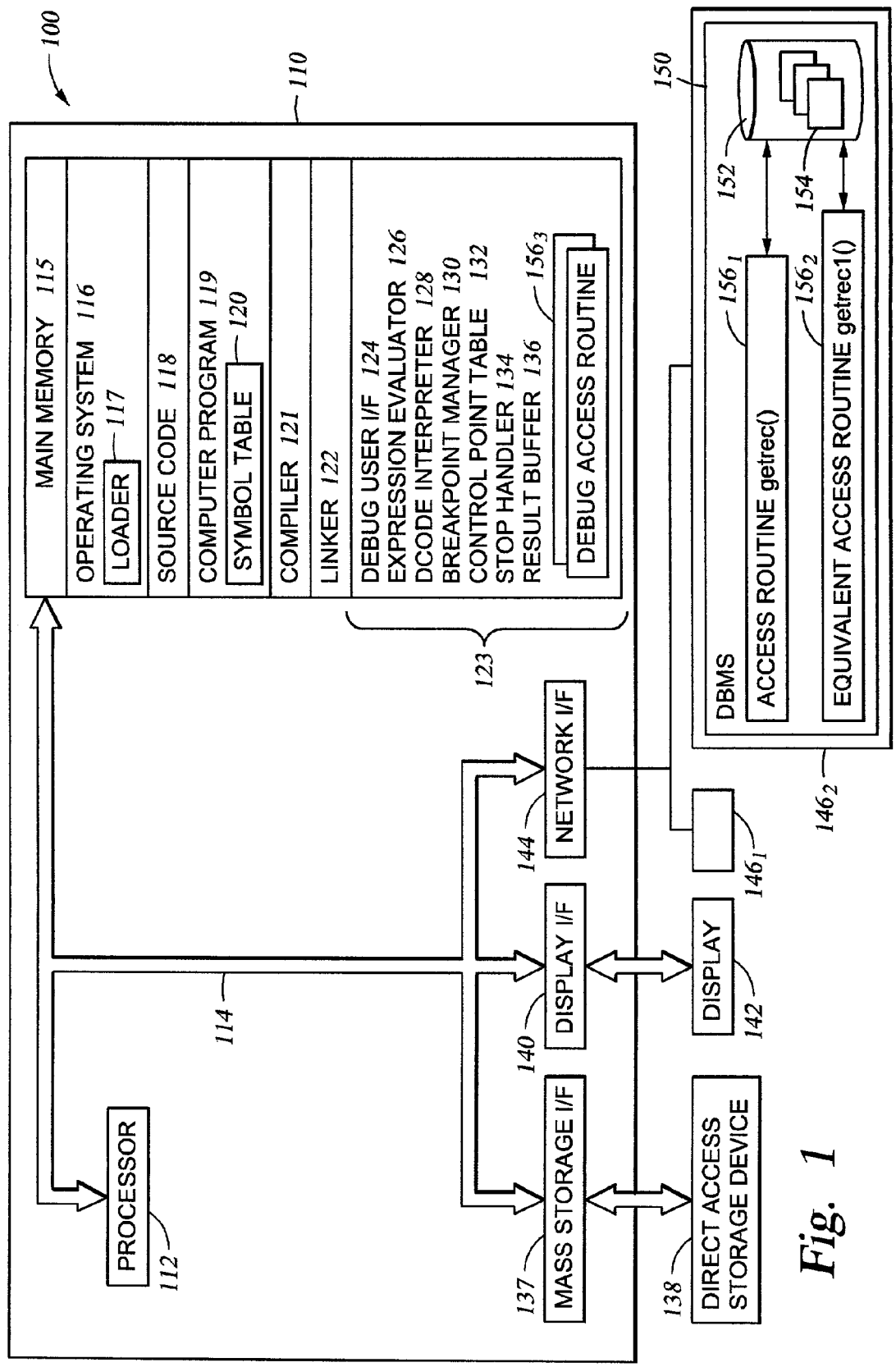
FIG. 1 is a block diagram of a computer.

The present invention generally provides methods, systems and articles of manufacture for providing descriptive information (e.g., in the form of text) for variables during debugging.

One embodiment of the invention is implemented as a program product for use with a computer system such as, for example, the computing environment shown in FIG. 1 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention provides embodiments in which variable information (i.e., information related to one or more variables) is acquired and displayed. In one embodiment, a comment(s) associated with a selected variable is displayed. Such comments generally include internal comments and external comments. Internal comments refer to comments embedded within the source code. External comments refer to comments located externally to the source code (e.g., within a database). In the case of internal comments, the displayed internal comment may be, for example, a comment proceeding the variable declaration of the selected variable, a comment on the same physical line as the selected variable or the next comment found in the code. In one embodiment, the particular association between comments and variables may be assumed (e.g., by a compiler) in order to identify a comment for a given variable. In an alternative embodiment, user style rules applied locally at a user's computer may be used to define the association between comments and variables. In the latter embodiment, the user may be a person programming the code, a person compiling the code or simply the last person to modify the code. In any case, the comment for a selected variable may be displayed using a variety of techniques. For example, the comment may be displayed in fly-over text when a mouse cursor is positioned over or proximate to the variable.

In another embodiment, information describing the use of a variable (referred to herein as "use information" or "machine-generated comment(s)") may be displayed. In one embodiment, use information is represented by one or more of a group of characters representative of a word or words. One such group of characters and their respective meanings is as follows: G(global), S(static), I(index), P(parameter), R(return), C(call). As in the previous embodiment, these characters may be displayed in fly-over text when a mouse cursor is positioned over or proximate to the variable.

In another embodiment, the user may be shown where a selected variable is defined. For example, the particular line number at which the variable is defined may be displayed. The variable may be identified by any variety of techniques including marking a scroll bar, highlighting the variable, underlining the variable and the like.

In another embodiment, the next instance(s) of a selected variable may be indicated to a user. In this regard the "next instance(s)" refers to any subsequent instance of the selected variable in the displayed source code, regardless of whether the variable is in the control flow path of the present path of execution. The variable instances may be identified by any variety of techniques including marking a scroll bar, highlighting the variable, underlining the variable and the like.

For simplicity, the foregoing embodiments will be described collectively below. However, it is understood that each of the foregoing embodiments may be used together or separately. Thus, one illustrative system may be configured to implement only one of the foregoing features. Another illustrative system may be configured to implement two or more of the foregoing features.

Referring now to FIG. 1, a computing environment 100 is shown. In general, the computing environment 100 includes a computer 110 and a plurality of networked devices 146. The computer 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer 110 is an eServer iSeries 400 available from International Business Machines of Armonk, N.Y.

Illustratively, the computer 110 comprises a networked system. However, the computer 110 may also comprise a standalone device, in which case the components and functions, whether residing in hardware or software, are part of a single computer, including its peripherals. Accordingly, as used herein, "computer" and "computer system" may be used interchangeably. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer 110 and one or more of the networked devices 146 may be thin clients which perform little or no processing. Further, the components and functions (whether residing in hardware or software) represented by the networked devices 146 may be part of the computer 110 in some embodiments.

In one embodiment, one networked device $146_2$ is a computer configured with a database management system (DBMS) 150. The database management system 150 includes a database 152 which may be any variety of repositories, including relational databases, XML databases and the like. The database 152 provides one example of an external data source for external comments and other variable information. Illustratively, the database 152 is shown containing a plurality of tables 154, each of which comprise a plurality of records containing data. The database management system 150 generally includes one or more access routines capable of retrieving data from the database 152. Illustratively, two access routines $156_1$ and $156_2$ are shown. A first access routine $156_1$ may be any routine capable of accessing data from the database 152 according to well-known techniques. A second access routine $156_2$ (also referred to herein as the "equivalent access routine") includes the functionality of the first access routine and is extended to retrieve external comments from the database 152. In one embodiment, a variable ID is passed as a parameter to a debugger access routine $156_3$ which uses the equivalent access routine $156_2$ to associate an external variable description (e.g., from the database 152) with an entry in the symbol table 120. As such, the debugger access routine $156_3$ wrappers the equivalent access routine $156_2$, which returns an external comment, to associate the returned external comment with a variable being loaded. Such an embodiment will be further described below with reference to FIG. 5.

The computer 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer 110 is shown comprising at least one processor 112, which obtains instructions, or operation codes, (also known as opcodes), and data via a bus 114 from a main memory 115. The processor 112 could be any processor adapted to support the debugging methods of the invention. In particular, the computer processor 112 is selected to support the debugging features of the present invention. Illustratively, the processor is a PowerPC® processor available from International Business Machines Corporation of Armonk, N.Y.

The main memory 115 is any memory sufficiently large to hold the necessary programs and data structures. Main memory 115 could be one or a combination of memory devices, including Random Access Memory, nonvolatile or backup memory, (e.g., programmable or Flash memories, read-only memories, etc.). In addition, memory 115 may be considered to include memory physically located elsewhere in a computer 110, for example, any storage capacity used as virtual memory or stored on a mass storage device or on another computer coupled to the computer 110 via bus 114.

As shown, the main memory 115 generally includes an operating system 116, source code 118, a computer program 119, a compiler 121, a linker 122 and debugger program (the debugger) 123. The operating system may be any suitable operating system such as the Linux® operating system. Illustratively, the operating system includes a loader 117 configured to load the computer program 119 into memory 115 from some storage device (e.g., DASD 138). The computer program 119 represents any code that is to be examined, edited, compiled and/or debugged. In one embodiment, the debugger 123 is a VisualAge® debugger, modified according to the invention. VisualAge® is product available from International Business Machines Corporation of Armonk, N.Y.

Although the software constructs, such as the computer program 119 and the debugger 123, are shown residing on the same computer, a distributed environment is also contemplated. Thus, for example, the debugger 123 may be located on a networked device 146, while the computer program 119 to be debugged is on the computer 110.

In operation, the compiler 121 parses the source code 118 to produce object code. The object code can then be linked by the linker 122 to produce a complete program 119. As part of the compilation process, the compiler 121 produces a symbol table 120 which is a collection of symbols (variables and types along with scoping information) within the program 119. A portion of the content of the symbol table 120 makes up debug data used to advantage in embodiments of the invention. In particular, in one embodiment, the debug data comprises a plurality of records for each variable within the program 119. An illustrative debug data record (of the symbol table 120) for a variable is described below with reference to FIG. 3.

In a specific embodiment, the debugger 123 comprises a debugger user interface 124, expression evaluator 126, Dcode interpreter 128 (also referred to herein as the debug interpreter 128), control point table 132, debugger hook 134 (also known as a stop handler), a breakpoint manager 135 and a results buffer 136. Although treated herein as integral parts of the debugger 123, one or more of the foregoing components may exist separately in the computer 110. Further, the debugger may include additional components not shown.

Figure 2:
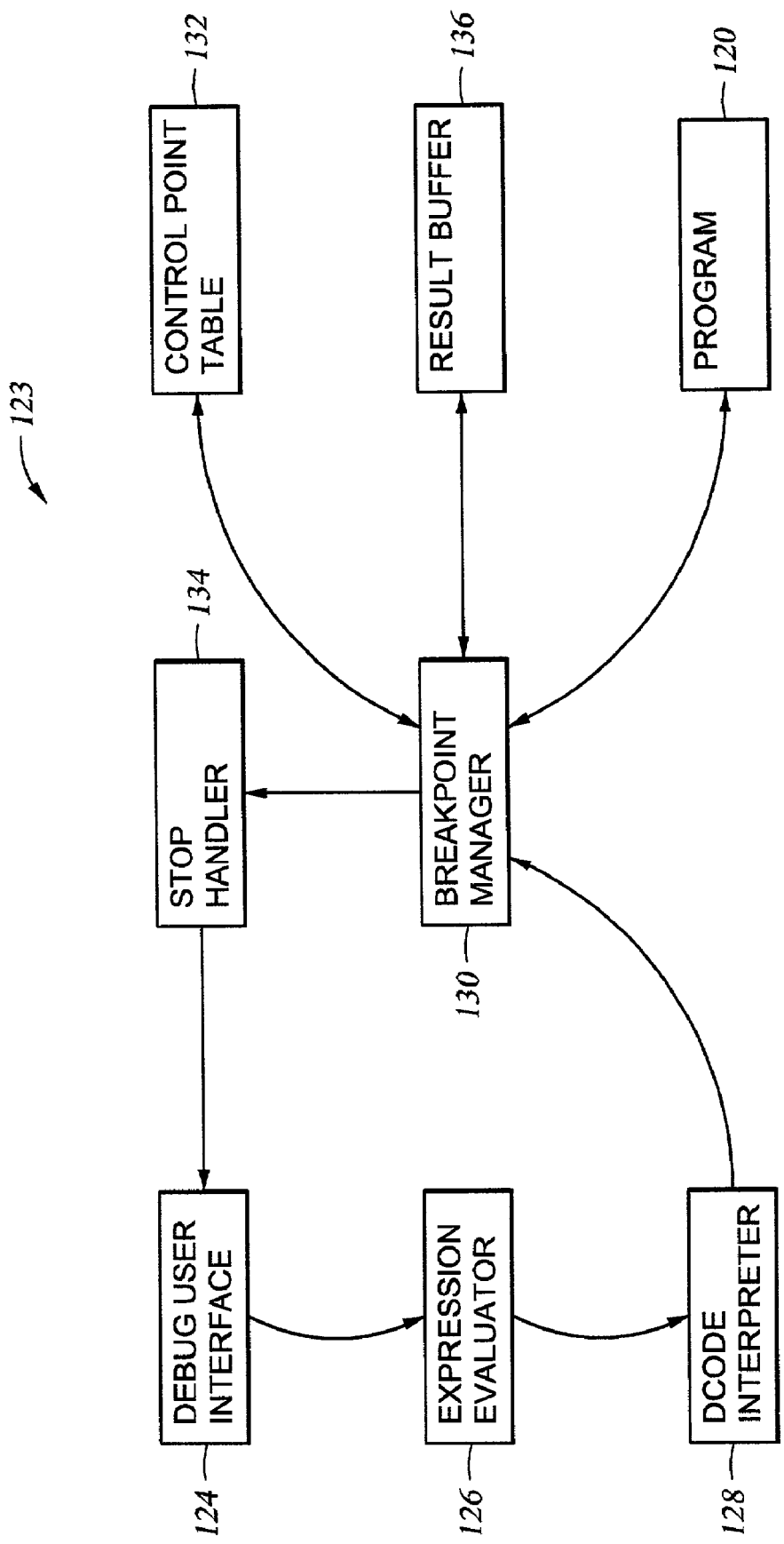
FIG. 2 is a block diagram illustrating the operation of a debugger.

The relationship of the debugger components may be described with reference to FIG. 2. A debugging process is initiated by the debug user interface 124. The user interface 124 presents the program under debugging and highlights the current line of the program on which a stop or error occurs. The user interface 124 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross-referenced.

In the embodiments of the invention, the debug user interface 124 also displays variable information. The variable information is generally any information describing variables. Illustrative examples of variable information described above include comments, declaration location, use information, next instance(s). The manner in which this information may be indicated on a display (e.g., display 142) will be described below with reference to FIG. 7.

The expression evaluator 126 parses the debugger command passed from the user interface 124 and uses a data structure (e.g., the symbol table 120) generated by the compiler 121 to map the line number in the debugger command to the physical memory address in memory 115. In addition, the expression evaluator 126 generates a Dcode program for the command. The Dcode program is machine executable language that emulates the commands. Some embodiments of the invention include Dcodes which, when executed, activate control features described in more detail below.

The Dcode generated by the expression evaluator 126 is executed by the Dcode interpreter 128. The interpreter 128 handles expressions and Dcode instructions to perform various debugging steps. Results from Dcode interpreter 128 are returned to the user interface 124 through the expression evaluator 126. In addition, the Dcode interpreter 128 passes on information to the debug hook 134, which takes steps described below.

After the commands are entered, the user provides an input that resumes execution of the program 119. During execution, control is returned to the debugger 123 via the debug hook 134. The debug hook 134 is a code segment that returns control to the appropriate user interface. In some implementations, execution of the program eventually results in an event causing a trap to fire (e.g., a breakpoint or watchpoint is encountered). Inserting and managing special op codes that cause these traps to fire is the responsibility of the breakpoint manager 235. When a trap fires, control is then returned to the debugger by the debug hook 134 and program execution is halted. The debug hook 134 then invokes the debug user interface 124 and may pass the results to the user interface 124. Alternatively, the results may be passed to the results buffer 136 to cache data for the user interface 124. In other embodiments, the user may input a command while the program is stopped, causing the debugger to run a desired debugging routine. Result values are then provided to the user via the user interface 124.

Referring briefly to FIG. 7, an illustrative output screen 700 of the user interface 124 is shown. By way of example, the screen 700 is a graphical user interface. However, the invention is not limited to graphical user interfaces and other interfaces, such as green screens, are contemplated. In general, the screen 700 includes one or more panels configured for displaying selected information. In the illustrative screen 700, two panels 702, 704 are shown. In other embodiments, more or less panels may be provided. The first panel 702 is a source code panel for displaying the source code 118. A variable "stuff" is declared on line 29 and will be referred to from time to time for purposes of describing aspects of the invention. The second panel 704 includes three tabs which provide, in part, well-known debugging features such as providing variable names and values and program monitors. Illustratively, a "Locals" tab 706 is selected and displays a Name column, Value column and Description column. The Name column and Value column display a variable name and value, respectively. The Description column contains variable description information associated with the respective variable. For example, as seen on line 29 in the source code panel 702 the variable "stuff" has an associated comment: "stuff is important to output". Accordingly, this comment is shown in the Description column on the row for the variable "stuff". Other aspects of the screen 700 will be described below.

Referring now to FIG. 3, an illustrative debug data record 300 of the symbol table 120 is shown. As noted above, the debug data of the symbol table 120 comprises a plurality of records for each variable within the program 119. The debug data record 300 is representative of one such record for one variable. Illustratively, the name of the variable for the record 300 is "stuff" and is represented in a name field 302. Each variable has an associated ID or handle (contained in an ID field 304) by which the variable may be uniquely referenced. In one embodiment, the ID is passed as a parameter to an access routine capable of retrieving a variable description (e.g., an external comment) from an external data source (e.g., database 152). An addressing value contained in addressing field 306 is used in some embodiments to retrieve the variable's value. Illustratively, the addressing value is a stack pointer plus some value, in this case 600. The value in a type field 308 provides a handle to type information. The value may be, for example, an address, an offset, a unique number or the like. Internal comments embedded within the source code 118 are located in an internal comment field 310. The illustrative internal comment associated with the variable "stuff" is "stuff is important to output". Fields 312–322 are flags whose value describes an attribute of the variable "stuff". Illustrative attributes include a global attribute (field 312), a static attribute (field 314), an index attribute (field 316), a return attribute (field 318), a call attribute (field 320), and a parameter attribute (field 322). In one embodiment, each of the attributes are represented to a user by a character(s). One such group of characters and their respective meanings is as follows: G(global), S(static), I(index), R(return), C(call) and P(parameter). Field 324 is configured to hold an external comment from an external data source (e.g., database 152). A declaration location field 326 contains a value indicating where the variable "stuff" is declared. Illustratively, the value contained in the declaration location field 326 is a line number. In this case, the line number is 29 as can be seen from the source code panel 702 of the screen 700 shown in FIG. 7. Fields 328–330 contain next instance information indicative of the next instance of the variable "stuff" in the source code 118 relative to a current position (e.g., within the source code panel 702). In one embodiment, next instance information is characterized as one of a referenced location (field 328) and an updated location (field 330). In this context, referenced locations refer to statements in which the variable is referenced but not updated. That is, the name of the variable appears in a statement in a way indicative that the variable is unlikely to be changed. In contrast, updated locations refer to statements in which the variable is updated.

It should be understood that the fields contained in the debug data record 300 are merely illustrative. Some embodiments (including some described herein) may be implemented without all of the fields shown in the debug data record 300. In other embodiments, additional fields may be included.

Figure 4A:
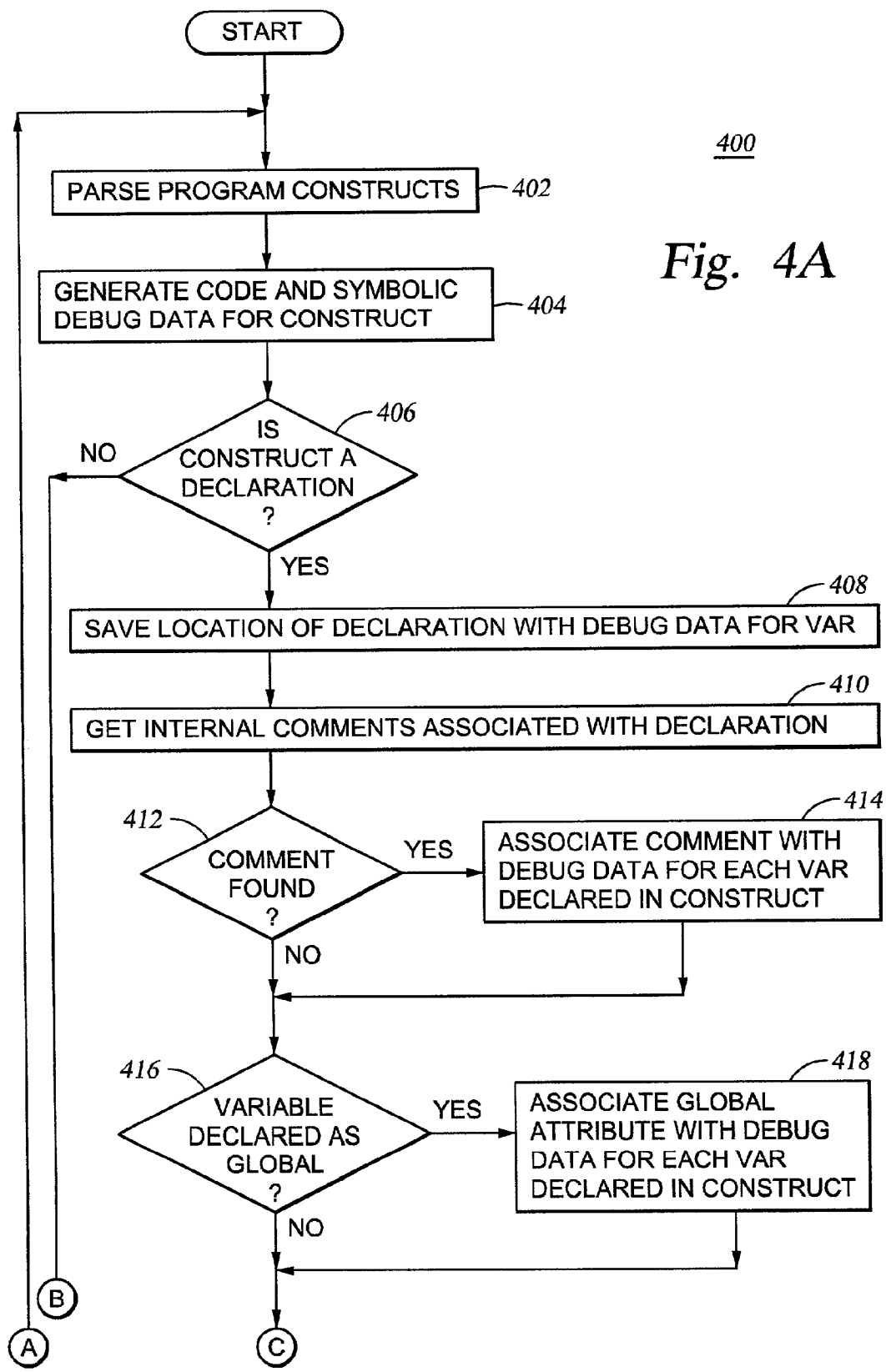
FIGS. 4A–C is a compilation process during which debug data is gathered.
Figure 4B:
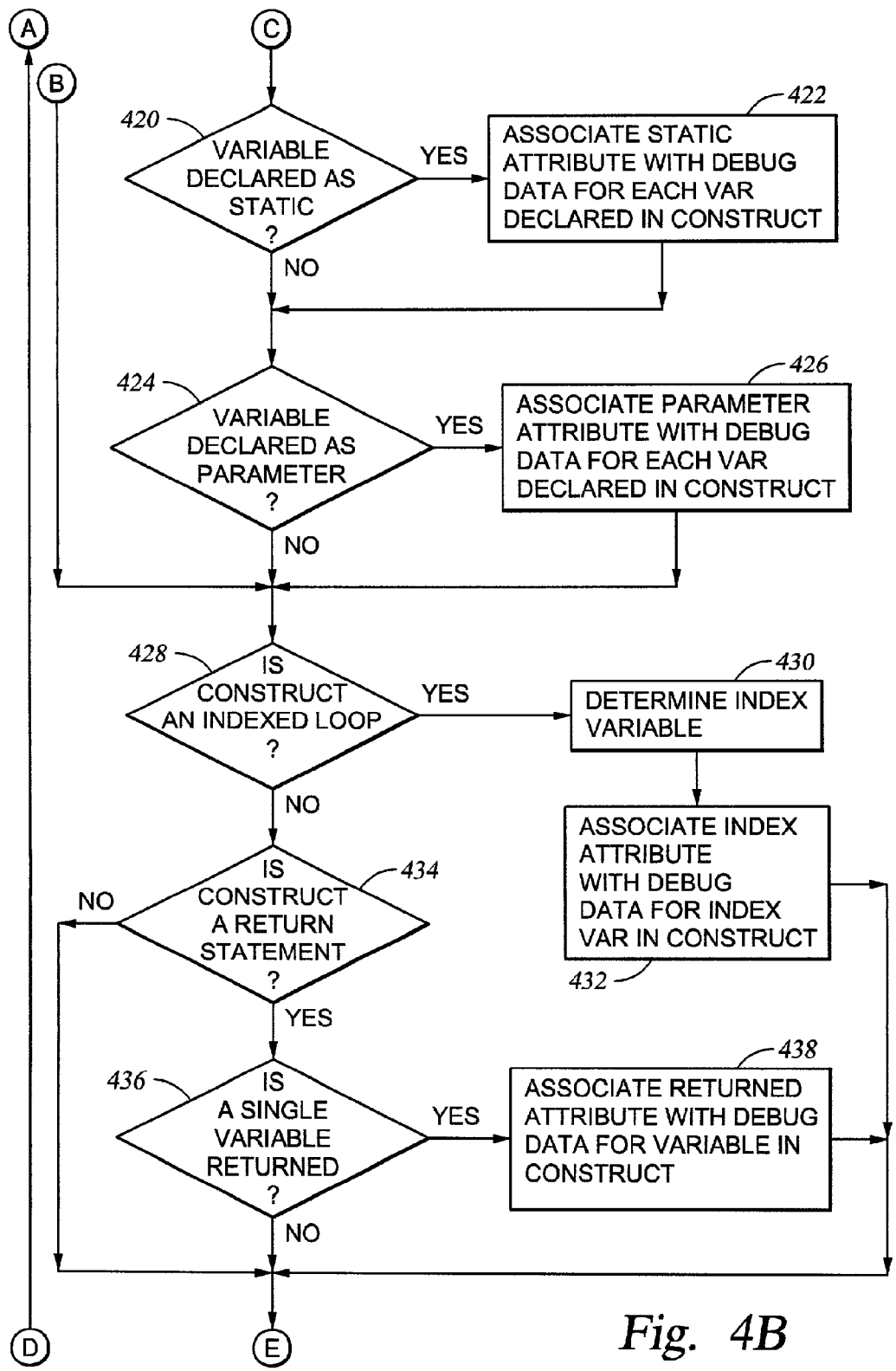
Figure 4C:
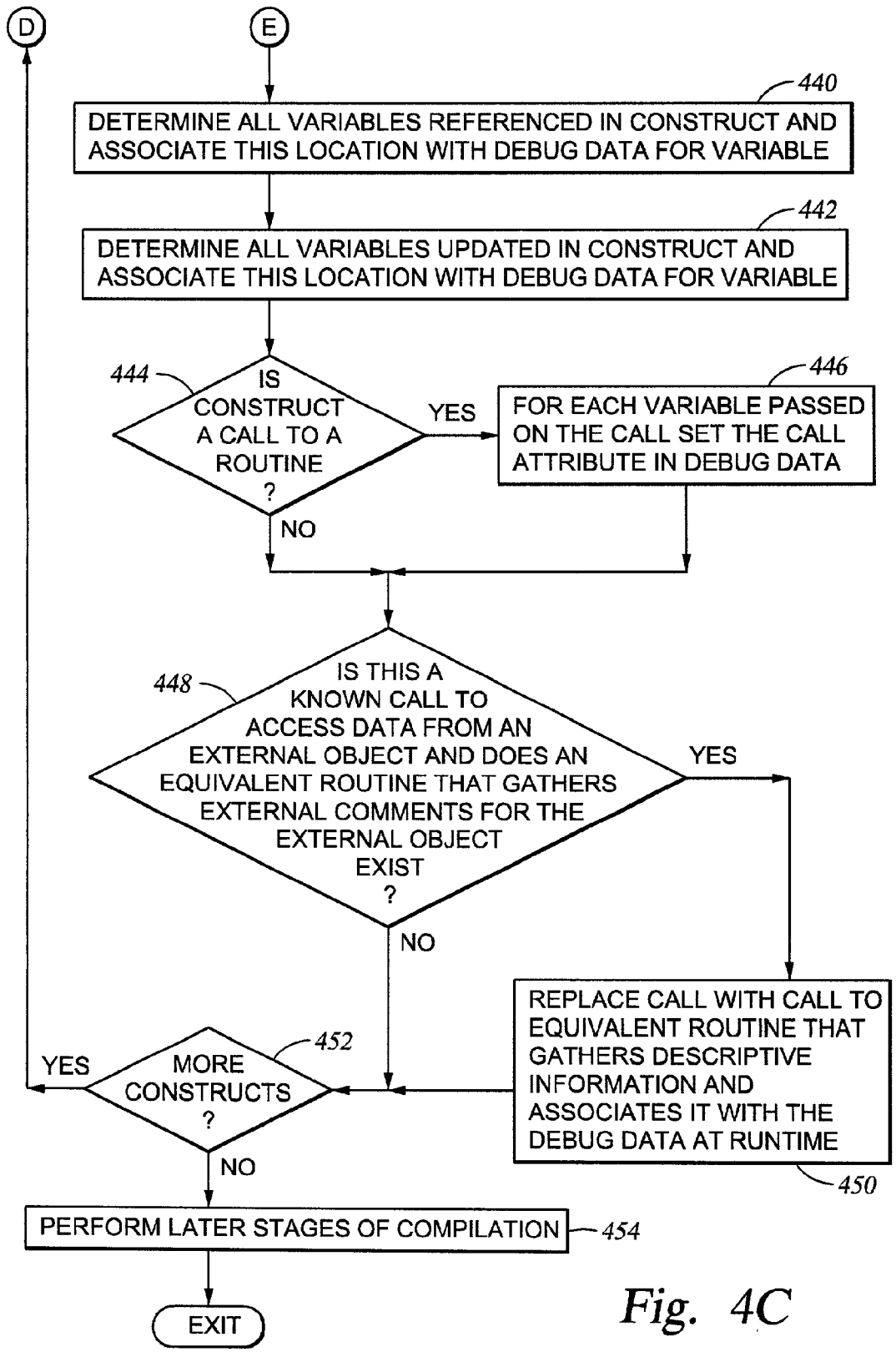

Referring now to FIGS. 4A–C (collectively FIG. 4), a compilation process 400 of the compiler 121 is shown. At step 402, the compiler 121 begins parsing program constructs of the source code 118. At step 404, the compiler 121 generates code and symbolic debug data for a given program construct. The compiler 121 then determines (at step 406) whether the construct is a declaration. If not, processing proceeds to step 428. Otherwise, processing proceeds to step 408 where the compiler 121 attempts to locate any internal comment associated with the declaration. As described above, the rules by which the compiler determines associated comments may vary according to different embodiments. In a particular embodiment the compiler 121 may be directed to locate a comment immediately before or after the declaration. In another embodiment, the rules for locating comments may be determined according to user configurable preferences. If a comment is found (at step 412) the comment is associated (at step 414) with debug data for each variable declared in the construct. That is, the compiler 121 writes the internal comment to the comment field 310 of the appropriate debug data record in the symbol table 120.

If a comment is not found at step 412, or following entry of the comment into the symbol table 120 at step 414, processing proceeds to step 416 where the compiler 121 determines whether any of the variables in the present construct are declared as global. If so, at step 418, a global attribute is associated with the debug data for each variable declared as global in the construct. That is, the global attribute flag in the field 312 of the appropriate debug data record is set to ON. Processing then proceeds to step 420. Processing also proceeds to step 420 from step 416, if step 416 is answered negatively.

At step 420, the compiler 121 determines whether any variable in the present construct is declared as static. If so, at step 422, a static attribute is associated with the debug data for each variable declared as static in the construct. That is, the static attribute flag in the field 314 of the appropriate debug data record is set to ON. Processing then proceeds to step 424. Processing also proceeds to step 424 from step 420, if step 420 is answered negatively.

At step 424, the compiler 121 determines whether a variable in the construct is declared as a parameter. If so, at step 426, a parameter attribute is associated with the debug data for each variable declared as a parameter in the present construct. That is, the parameter attribute flag in the field 322 is set to ON. Processing than proceeds to step 428. Processing also proceeds to step 428 from steps 406 and 420 if either step is answered negatively.

At step 428, the compiler determines whether the present construct is an indexed loop. If so, the index variable is determined at step 430 and an indexed attribute is associated (at step 432) with the debug data for each index variable in the construct. That is, the index attribute flag of the field 316 is set to ON. Processing then proceeds to step 440.

If, however, step 428 is answered negatively, the compiler 121 determines (at step 434) whether the construct is a return statement. If not, processing proceeds to step by 440. However, if the construct is a return statement, the compiler determines (at step 436) whether a single variable is returned, as opposed to an expression. If so, at step 438, a return attribute is associated with the debug data for each variable in the construct. That is, the flag of the return attribute field 318 is set to ON.

At steps 440 and 442, the compiler 121 gathers "next instance information" for each of the variables in the present construct. Specifically, at step 440, the compiler determines all variables referenced in the construct and associates this location with debug data for each respective variable. That is, the compiler populates the referenced location field 328 with the appropriate statement numbers for each respective variable in the construct. At step 442, the compiler determines all variables updated in the present construct and associates this location with debug data for each variable by populating the updated location field 330 with the appropriate statement number for each variable.

Processing then proceeds to step 444 where the compiler determines whether the construct is a call to a routine. If so, for each variable passed on the call, the compiler sets the appropriate call attribute flag in a call attribute field 320. Processing then proceeds to step 448. Processing also proceeds to step 448 from step 444 if step 444 is answered negatively.

At step 448, the compiler determines whether the construct is a call to a routine to access data from an external object and for which an equivalent routine that gathers external comments for the external object exists. The access routine $156_1$ is an example of an access routine having an equivalent access routine $156_2$ that gathers external comments from the database 152. Accordingly, using the access routines $156_1$ and $156_2$ as examples, if the construct being compiled at step 448 includes the access routine $156_1$, then step 448 is answered affirmatively and processing proceeds to step 450. At step 450, the call of the present construct is replaced with a call to the equivalent routine, after which processing proceeds to step 452. Processing also proceeds to step 452 if step 448 is answered negatively.

At step 452, the compiler determines whether more constructs for the computer program 119 must be compiled. If so, processing returns to step 402 to begin compiling the next construct. Otherwise, processing proceeds to step 454 where the compiler performs later stages of compilation (e.g., optimization).

Figure 5B:
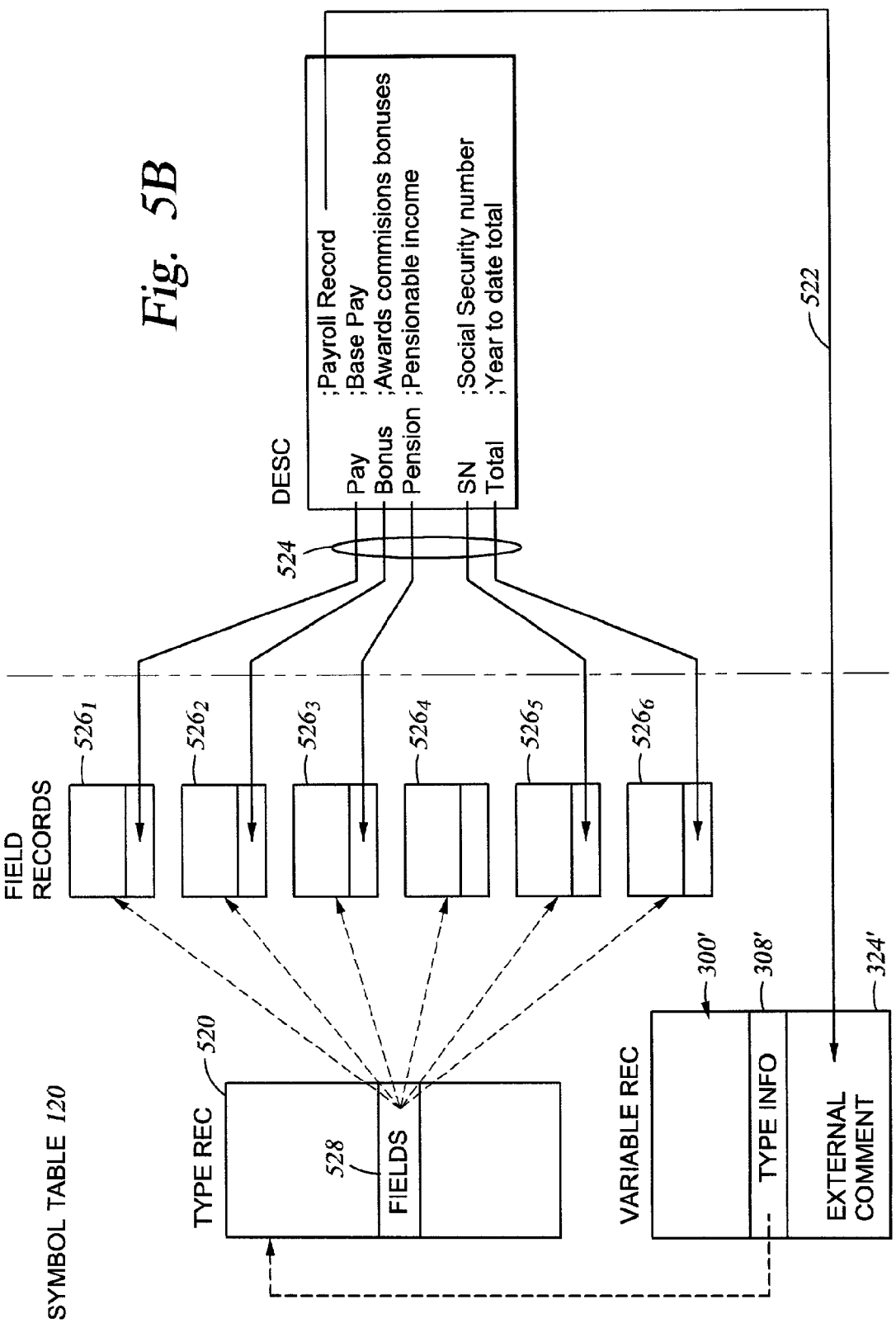

Referring now to FIGS. 5A–B (collectively FIG. 5), a block diagram 500 is shown illustrating compile time and run-time aspects of one embodiment of the invention in which external variable description information is retrieved from the database 152. Illustratively, the database 152 is configured with database description language 502 which describes a schema/format for data entry within the records of the database 152. The database description language 502 is placed into a header 504 when the database 152 is created. At compile time, the source code 118 is compiled by the compiler 121, which outputs object code. The object code is then linked by the linker 122 to produce the resulting computer program 119 which is subsequently loaded by the loader 117. The program 120 then begins executing. Note that the source code 119 includes a call 508 to the access routine $156_1$ (shown in FIG. 1). The call 508 takes as parameters DB (specifying a particular database, e.g., database 152) and rec (specifying a particular record within the specified database). Following compilation, the call 508 has been replaced with a call 512 to the debugger access routine $156_3$. At the call 512, execution branches to a sequence of instructions containing a call 510 to the equivalent routine $156_2$. The call statement 512 takes as parameters DB, rec and an identifier, illustratively 76, identifying the variable whose symbol table entry the external comment is to be associated with. The call 510 to the equivalent routine $156_2$ takes as parameters DB, rec and a buffer (desc) to hold the external comment. During a subsequent update statement 514, the symbol table 120 is updated with the database description language, as represented by the perforated line 516. Specifically, at least a portion of the database description language is written to the external comment field 324 for the appropriate debug data record. Execution of the program 120 then continues.

Detailed aspects of the updating process are seen in FIG. 5B. In particular, the solid lines with arrowheads represent the perforated line 516 shown in FIG. 5A. One solid line 522 represents the "payroll record" comment (which is a general header comment for the variable rec) being placed in an external comment field 324' of a debug data record 300' for the variable rec. The debug data record 300' for the variable rec is similarly structured as the debug data record 300 for the variable stuff, described with reference to FIG. 3.

The remaining solid lines 524 represent the remaining comments from the database description language in the header 504, each of which are associated with a field of the records in the database. These comments are placed into individual field records $526_1 \ldots 526_6$ of the symbol table 120. The field records $526_1 \ldots 526_6$ are pointed to by fields 528 in a record for type rec, which is the type of the variable rec, as indicated in a type field 308' of the debug data record 300'. In one embodiment, the fields 528 are an array of pointers. In other embodiments, the fields 528 may be an array of field records, a pointer to a data structure (such as a binary tree) which contains the field records and the like.

It should be noted that the database 152 is merely one example of an external data source from which variable descriptions may be retrieved and provided to a user via the debugger 123. More generally, the external data source from which variable descriptions are retrieved includes any data source external to the source code 118 being debugged. For example, in another embodiment, the external data source is another computer program residing locally on the computer 110.

Figure 6A:
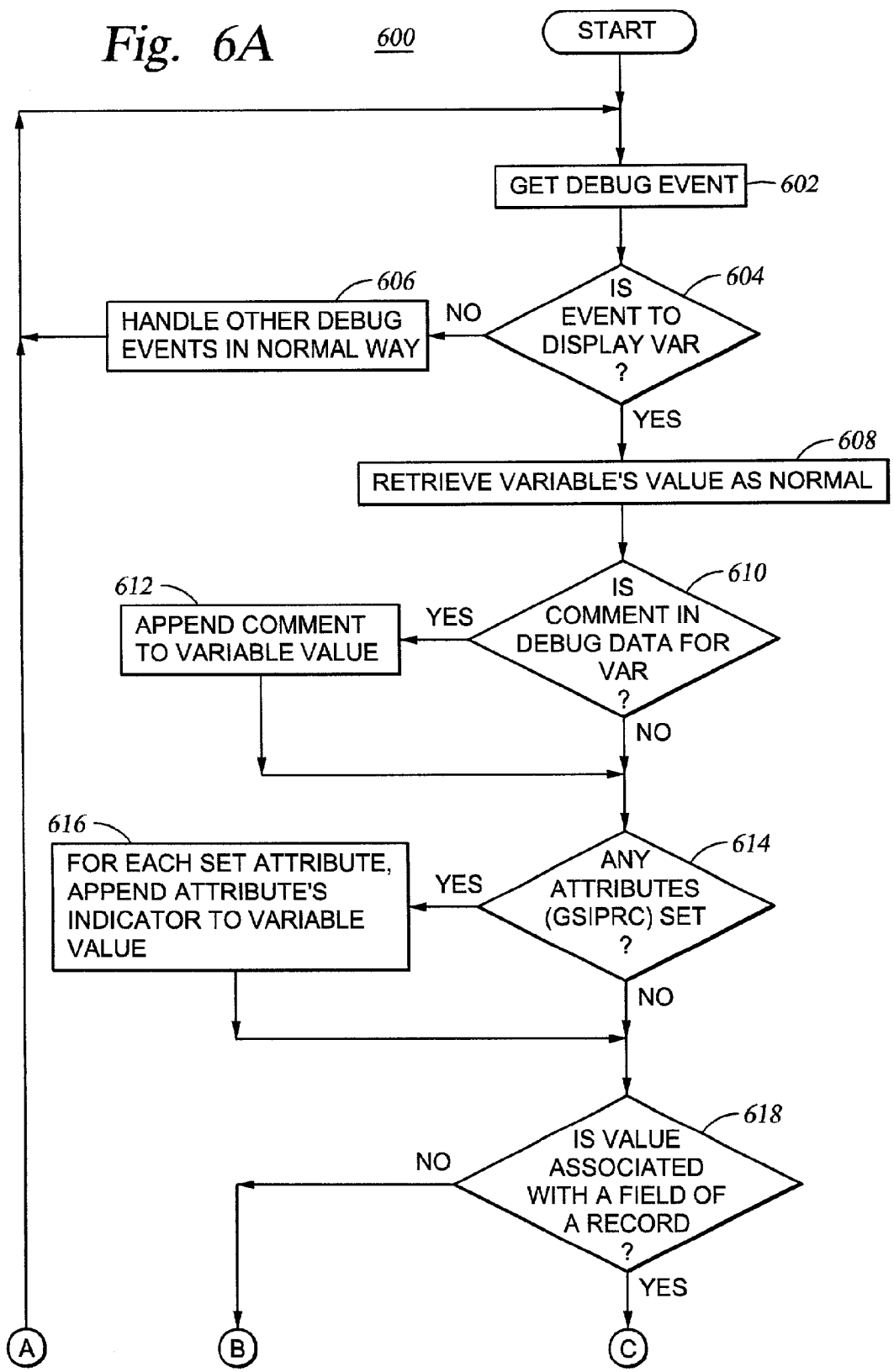
FIGS. 6A–B is a debugger process.
Figure 6B:
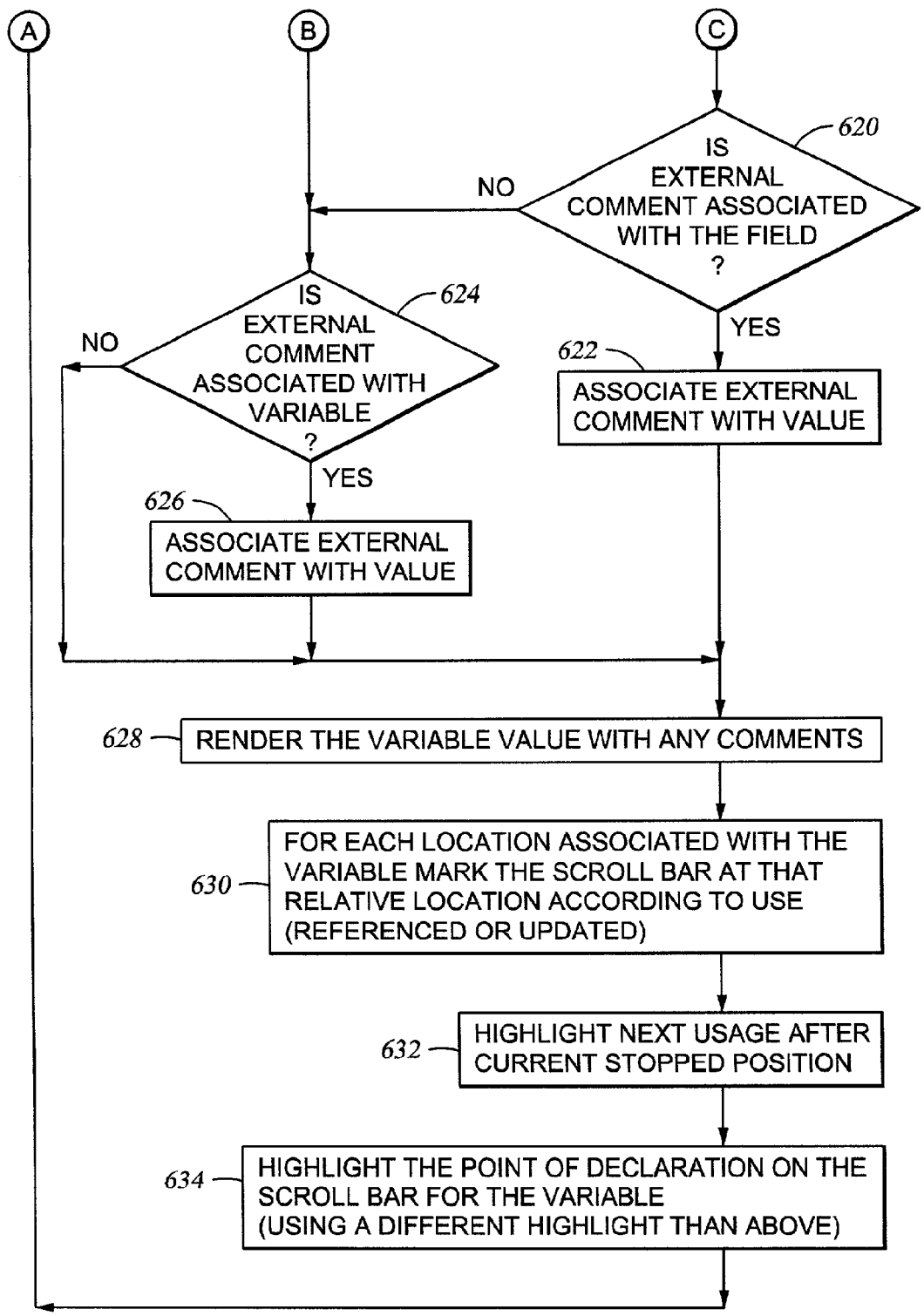

Referring now to FIG. 6, a method 600 of debugging implemented by the debugger 123 is shown. Before method 600 is entered, the program 119 may be executing during a debugging session. Accordingly, the runtime processing described with reference to FIG. 5 may have already occurred such that the external comment field 324 has been populated for one or more debug data records. At step 602, a debug event is received for processing at which time the debugger 123 gets control. The debug event may be any of well-known debug events, as well as events that implement the functions of embodiments of the invention. At step 604, the debugger 123 determines whether the event is to display a value. Such an event may be in response to a user placing a cursor adjacent a variable, placing a mouse pointer proximate a variable, entering a request for a variable value in a command line, etc. If the event is not to display a value, the event is handled in a conventional manner at step 606, after which processing returns to step 602 to receive the next debug event. If the event is to display a value, however, then processing proceeds to step 608 where a value is retrieved. At step 610, the debugger 123 determines whether an internal comment exists for the variable in the symbol table 120. If so, the comment is associated with a variable value at step 612. Processing then proceeds to step 614. Processing also proceeds to step 614 from step 610 if step 610 is answered negatively.

At step 614, the debugger 123 determines whether any attributes are set for the variable. Recall that in one embodiment the attributes are set in fields 312–322. If any attributes you set for the variable, then processing proceeds to step 616 where the appropriate attribute indicator (e.g., G, S, I, R, C, P) for each set attribute is associated with the variable value. Processing then proceeds to step 618. Processing also proceeds to step 618 from step 614 if step 614 is answered negatively.

At step 618, the debugger 123 determines whether the variable value is associated with a field of a record. That is, the debugger 123 determines whether a field is to be displayed, as opposed to a normal singular variable. If not, processing proceeds to step 624. Otherwise, if the variable value is associated with a field, processing proceeds to step 620 where the debugger 123 determines whether an external comment is associated with the field. If so, the external comment is associated with the value at step 622. Processing then proceeds to step 628.

If either steps 618 or 620 are answered negatively, processing proceeds to step 624 where the debugger 123 determines whether an external comment is associated with the variable. If so, the external comment is associated with the value at step 626. Processing then proceeds to step 628.

Steps 628–634 describe the type of variable information (associated with the variable value in the previous steps of method 600) and the manner in which the variable information is displayed to a user using the information contained in the debug data records of the symbol table 120. Accordingly, reference is made simultaneously to FIG. 7 which is representative of some embodiments of displaying such variable information. At step 628, the variable value and any associated comment(s) (internal, external or machine generated) are rendered on the display 142. Referring to FIG. 7, step 628 is represented in the form of a flyover text box 710. In this case, the flyover text box 710 appears in response to the position of the mouse pointer proximate the statement on line 37. Thus, in the illustrated embodiment, the debug event received at step 602 is the relative positioning of the mouse pointer with respect to the statement on line 37, thereby invoking the text box 710. Illustratively, the statement on line 39 contains the variable "stuff". Accordingly, the text box 710 displays the variable, its value, and associated comments. In the present example, the variable "stuff" has an associated internal comment ("stuff is important to output") and an associated machine-generated comment (C) indicating its usage. Since "stuff" is passed to "strcpy" and "memset" the machine-generated comment is C (the call attribute indicator).

At steps 630 and 632, attributes of the screen 700 are modified according to the usage of the selected variable (in the present example, "stuff" as selected by the position of the mouse pointer relative to the statement on line 37). At step 630, a puck 714 of a scroll bar 712 is formatted with hash marks 716–720 to indicate whether the variable indicated by a respective hash mark is used at that location (i.e., the statement indicated by the hash mark). It should be noted that the length of the puck 714 is proportionate to the viewable area in the source code panel 702. Accordingly, the hash marks 716–720 are located relative to their position in the viewable screen area. For cases in which the selected variable is used in statements not within the viewable screen area defined by the source code panel 702, the scroll bar 712 is formatted with hash marks, illustrated by the hash mark 724. In one embodiment, the hash marks are colored to indicate whether the associated variable is referenced or updated at the location indicated by the hash mark. Although the colors cannot be viewed in the black and white figure, it is can be understood that colored hash marks may be used to represent the manner in which a variable is used (referenced or updated) at the respective indicated location. For example, in one embodiment a blue hash mark 716 corresponding to line 36 indicates that the respective variable is referenced at that location. In contrast, red hash marks 718,720 corresponding to lines 37 and 43, respectively, indicate that the respective variables are updated at those locations. Whether a variable is referenced or updated is determined by the debugger by assessing the referenced location field 328 and the updated location field 330.

At step 632, the next usage of the selected variable after the current stopped position is highlighted. In the present example, the next usage of the selected variable occurs on line 43. Accordingly, the statement on line 43 is underlined.

Processing then proceeds to step 634 where the screen 700 is modified to indicate the point of declaration of the selected variable (in the present example, line 29). In one embodiment, this is accomplished by placing a hash mark 729 on the scroll bar 712 in a position corresponding with the position of the declaration on line 29. To distinguish between the hash marks 716–720 indicating the locations of usage, the color of the hash marks 729 may be different than that of the hash marks 716–720. For example, where the colors of the usage hash marks 716–720 are blue and red, the color of the declaration hash mark 729 may be green.

It is noted that the particular techniques used for formatting the screen 700 (e.g., underlining and hash marks) are merely illustrative. Other techniques which may be used include italicizing, bolding, changing font size and the like.

Some of the embodiments disclosed herein use a compiler to advantage for purposes of acquiring variable information (e.g., comments, usage information, variable location information, etc.) to display to a user. However, in another embodiment, a routine is provided to extract the variable information from the source code at debug time. For example, in one embodiment, an existing routine such as a language specific highlighting routine could be extended. In another embodiment, a routine that parses the source could be added. Today, such highlighting routines are commonly used by editors and debuggers for highlighting language keywords and special program constructs such as labels. The routines are implemented using well-known parsing techniques to parse the program and identify keywords. Once the keywords are identified, formatting information is placed around them so they will appear in highlighted form when rendered. In one embodiment of the present invention, these routines be configured to parse the source at the time it is to be displayed within the debugger, and either update the entries in the symbol table of the program with this additional information, or create a parallel symbol table which would contain this additional information. When a variable is subsequently displayed, the debugger could also retrieve this additional information and display it in the manner described above.

While the foregoing is directed to embodiments of the present invention, other and further embodiments of the invention may be devised without departing from the basic scope thereof, and the scope thereof is determined by the claims that follow.

What is claimed is:

1. A method of debugging code, comprising:
    executing the code during a debugging session;
    giving control to a debugging program when a debug event occurs;
    displaying a user interface screen of the debugging program, wherein the user interface screen comprises a source code panel displaying at least a portion of the code and at least one graphical control element configured to allow a user to manipulate the user interface screen; and
    in response to a user event, configuring the user interface screen with viewable attributes indicative of each instance of a variable in at least the code displayed in the source code panel, and reformatting the appearance of the at least one graphical control element to convey information related to the each instance of the variable in the code being debugged.

2. The method of claim 1, wherein the user event is a mouse pointer position relative to a statement in the source code panel.

3. The method of claim 1, further comprising, in response to the user event, retrieving debug data collected by a compiler, wherein the debug data specifies a location of the variable in the code and is used to determine a location of the viewable attributes in the user interface screen.

4. A storage medium containing a debug program which, when executed, performs an operation for debugging code, comprising:
    while executing the code during a debugging session, taking control of the code when a debug event occurs;
    rendering a debugger user interface screen, wherein the user interface screen comprises a source code panel displaying at least a portion of the code and at least one graphical control element configured to allow a user to manipulate the user interface screen; and
    in response to a user event, configuring the at least one graphical control element and user interface screen with viewable attributes indicative of each instance of a variable in at least the code displayed in the source code panel.

5. The storage medium of claim 4, wherein the user event is a mouse pointer position relative to a statement in the source code panel.

6. The storage medium of claim 4, further comprising, in response to the user event, retrieving debug data collected by a compiler, wherein the debug data specifies a location of the variable in the code and is used to determine a location of the viewable attributes in the user interface screen.

7. The storage medium of claim 4, wherein configuring the user interface screen with the viewable attributes comprises at least one of:
    formatting at least one of a scroll bar and a scroll bar puck with a mark indicating a statement in which the variable is declared; and
    formatting the statement in which the variable is declared to visually distinguish the statement from other statements not containing the variable.

8. The storage medium of claim 4, wherein configuring the user interface screen with the viewable attributes comprises at least one of:
    formatting at least one of a scroll bar and a scroll bar puck with a mark for each instance of the variable; and
    formatting each statement containing an instance of the variable to visually distinguish each statement from other statements not containing the variable.

9. The storage medium of claim 8, wherein each mark is color-coded to indicate whether the respective instance of the variable is updated or referenced.

10. The storage medium of claim 8, wherein each mark is color-coded to indicate the position of an immediately next instance of the variable, relative to a current stopped position, in the execution of the code, during a debugging session.

11. The storage medium of claim 8, wherein a position of each mark is reflective of a location of the respective instance of the variable in the code.

12. A computer, comprising (i) a display device, (ii) a memory containing a compiler and a debug program and (iii) a processor which at least:
    (a) executes the compiler to perform a compilation process, comprising:
        determining each instance of each variable in code; and
        updating a debug data record for each instance of each variable in the code; and
    (b) executes the debug program to perform a debugging process, comprising:
        in response to an event, rendering a user interface screen for display on the display device, the user interface screen comprising (i) a source code panel displaying the code which includes at least one instance of a variable and at least one graphical control element configured to allow user manipulation of the screen, and (ii) formatting the at least one graphical control element to display viewable attributes indicative of each instance of the variable in at least the code displayed in the user interface screen.

13. The computer of claim 12, wherein the event is a mouse pointer position relative to a statement in the source code panel.

14. The computer of claim 12, further comprising, in response to the event, retrieving debug data collected by a compiler, wherein the debug data specifies a location of the variable in the code and is used to determine a location of the viewable attributes in the user interface screen.

15. The computer of claim 12, wherein rendering the user interface screen with the viewable attributes comprises at least one of:
  formatting at least one of a scroll bar and a scroll bar puck with a mark indicating a statement in which the variable is declared; and
  formatting the statement in which the variable is declared to visually distinguish the statement from other statements not containing the variable.

16. The computer of claim 12, wherein configuring the user interface screen with the viewable attributes comprises at least one of:
  formatting at least one of a scroll bar and a scroll bar puck with a mark for each instance of the variable; and
  formatting each statement containing an instance of the variable to visually distinguish each statement from other statements not containing the variable.

17. The computer of claim 16, wherein each mark is color-coded to indicate whether the respective instance of the variable is updated or referenced.

18. The computer of claim 16, wherein each mark is color-coded to indicate the position of an immediately next instance of the variable, relative to a current stopped position, in the execution of code, during a debugging session.

19. The computer of claim 16, wherein a position of each mark is reflective of a location of the respective instance of the variable in the code.

20. A method of debugging code, comprising:
  executing the code during a debugging session;
  giving control to a debugging program when a debug event occurs;
  displaying a user interface screen of the debugging program, wherein the user interface screen comprises a source code panel containing code; and
  in response to a user event, configuring the user interface screen with viewable attributes indicative of each instance of a variable in at least the code displayed in the source code panel, wherein configuring the user interface screen with the viewable attributes comprises at least one of:
    formatting at least one of a scroll bar and a scroll bar puck with a mark indicating a statement in which the variable is declared; and
    formatting the statement in which the variable is declared to visually distinguish the statement from other statements not containing the variable.

21. A method of debugging code, comprising:
  executing the code during a debugging session;
  giving control to a debugging program when a debug event occurs;
  displaying a user interface screen of the debugging program, wherein the user interface screen comprises a source code panel containing code; and
  in response to a user event, configuring the user interface screen with viewable attributes indicative of each instance of a variable in at least the code displayed in the source code panel, wherein configuring the user interface screen with the viewable attributes comprises at least one of:
    formatting at least one of a scroll bar and a scroll bar puck with a mark for each instance of the variable; and
    formatting each statement containing an instance of the variable to visually distinguish each statement from other statements not containing the variable.

22. The method of claim 21, wherein each mark is color-coded to indicate whether the respective instance of the variable is updated or referenced.

23. The method of claim 21, wherein each mark is color-coded to indicate the immediately next instance of the variable, relative to a current stopped position, in an execution path of the code being debugged during the debugging session.

24. The method of claim 21, wherein a position of each mark is reflective of a location of the respective instance of the variable in the code.

* * * * *